United States Patent
Harben, Jr. et al.

[11] 3,908,229
[45] Sept. 30, 1975

[54] VACUUM EVISCERATOR APPARATUS AND METHOD

[75] Inventors: Grover S. Harben, Jr., Gainesville; Kenneth Z. Graham, Dawsonville, both of Ga.

[73] Assignee: Gainesville Machine Co., Inc., Gainesville, Ga.

[22] Filed: Jan. 12, 1972

[21] Appl. No.: 217,206

[52] U.S. Cl. .................................................. 17/11
[51] Int. Cl. ............................................. A22b 3/08
[58] Field of Search ............................. 17/11.3, 45

[56] References Cited
UNITED STATES PATENTS

| | | | |
|---|---|---|---|
| 2,997,736 | 8/1961 | Ine | 17/11 |
| 3,750,231 | 8/1973 | Schreuder | 17/11 |
| 3,802,028 | 4/1974 | Scheier | 17/11 |

*Primary Examiner*—Robert Peshock
*Attorney, Agent, or Firm*—B. J. Powell

[57] ABSTRACT

A lung removal method and apparatus for poultry in which an access opening to their body cavity has been formed at their vent wherein the apparatus includes a conveyor from which shackle members are flexibly suspended to engage and support the poultry by their hocks, a guide for selectively locating the shackle members, a positioning member having a hook engageable with the poultry at their access opening in opposition to the shackle member and means for selectively varying the spacing between the hook and the shackle member to support poultry between the shackle member and hook so that the access opening is in a fixed plane while the breast portion of the poultry is flexibly supported in a cantilever fashion through its bone and muscle structure. A vacuum tool is reciprocally mounted on a traveling table adjacent the fixed plane in which the access opening is located and extendible through the fixed plane and access opening into the body cavity while the table moves the tool along in alignment with the poultry. The tool is provided with an open mouth at the extending end thereof through which a vacuum is imposed while the tool is positioned in the body cavity to remove the lungs.

The method of the invention includes the steps of supporting poultry by its hocks and at an access opening at the vent so as to locate the access opening in a fixed plane while the breast portion of the poultry is flexibly supported therefrom in cantilever fashion through the bone and muscle structure of the poultry. The method also includes inserting an eviscerating tool through the access opening to eviscerate the poultry it is supported. A vacuum may be imposed through the tool to remove the viscera.

23 Claims, 17 Drawing Figures

Fig 4

VACUUM EVISCERATOR APPARATUS AND METHOD

BACKGROUND OF THE INVENTION

In the process of poultry, the viscera must be removed from the carcass. Because of the variation in bird cavity size and the complex manipulation of the viscera required to remove the same, the eviscerating operation has remained a manual operation until recently. The attempts to mechanically eviscerate poultry have been partially successful in that the bulk of the viscera was removed. However, certain organs of the viscera, principally the lungs, have not been successfully removed mechanically because of their location within the thoracic region of the body cavity between the ribs. The major problem with prior art poultry eviscerating systems has been the inability to successfully locate the access opening at the vent of the bird in the same location so that the eviscerating tool can be properly inserted into the body cavity while at the same time allowing the forward portion of the body (i.e., the breast portion) to move as the tool is inserted into the body cavity and allow the leading edge of the tool to pass along the breast bone and withdraw along the backbone without damage to the carcass. Therefore, the removal of these organs is still primarily a time consuming manual operation even though manually operated vacuum nozzles such as that disclosed in U.S. Pat. No. 3,451,097 have been provided.

SUMMARY OF THE INVENTION

These and other problems associated with prior art poultry eviscerating apparatus are overcome by the invention disclosed herein by providing means for accurately locating the access opening at the vent of the bird in a fixed plane while allowing the breast portion thereof to be resiliently moved with respect to the access opening and for mechanically removing those organs of the viscera of poultry that are not easily accessible. Such means performs this operation automatically thus eliminating the manual prior art procedures. Moreover, the invention can be operated at processing plant line speed to eliminate the need for multiple processing lines required by the prior art.

The apparatus for positioning the bird includes an overhead conveyor means having shackle members for supporting and for moving the birds along a prescribed path in a head lowermost position, guide means for locating said shackle members as they are moved along the prescribed path, carcass positioning means for engaging the birds at their access openings, means for synchronizing the movement between the shackle members and the carcass positioning means, and spacing means for selectively varying the distance between the shackle members and the carcass positioning means to cause the access opening to be accurately located in a fixed plane while the breast portion of the bird is allowed to be resiliently moved with respect to the access opening.

The apparatus for removing the viscera includes at least one nozzle tool for extension into the body cavity of the bird and connected to a vacuum source. The tool is reciprocally mounted on a reciprocating frame. The tool is reciprocated perpendicular to the path of travel of the poultry and substantially perpendicular to the plane of the access opening at the vent. The frame is moved along a path parallel to the path of travel of the poultry and at a speed during its forward stroke equal to the conveyor speed.

The method of the invention includes the steps of accurately locating the access opening at the vent of the bird in a fixed plane while allowing resilient movement of the breast portion of the bird with respect to the vent opening, inserting an eviscerating tool having a vacuum inlet opening into the body cavity of the bird, positioning the inlet opening over a prescribed organ area within the body cavity and imposing a vacuum on the inlet opening to withdraw an organ from the body cavity. The method may also include reciprocating the inlet opening across the prescribed organ area and intermittently imposing the vacuum on the inlet opening while it is reciprocated.

These and other features and advantages of the invention will become more fully understood upon consideration of the following detailed description and accompanying drawings wherein like characters of reference designate corresponding parts throughout the several views and in which:

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Figure 1:
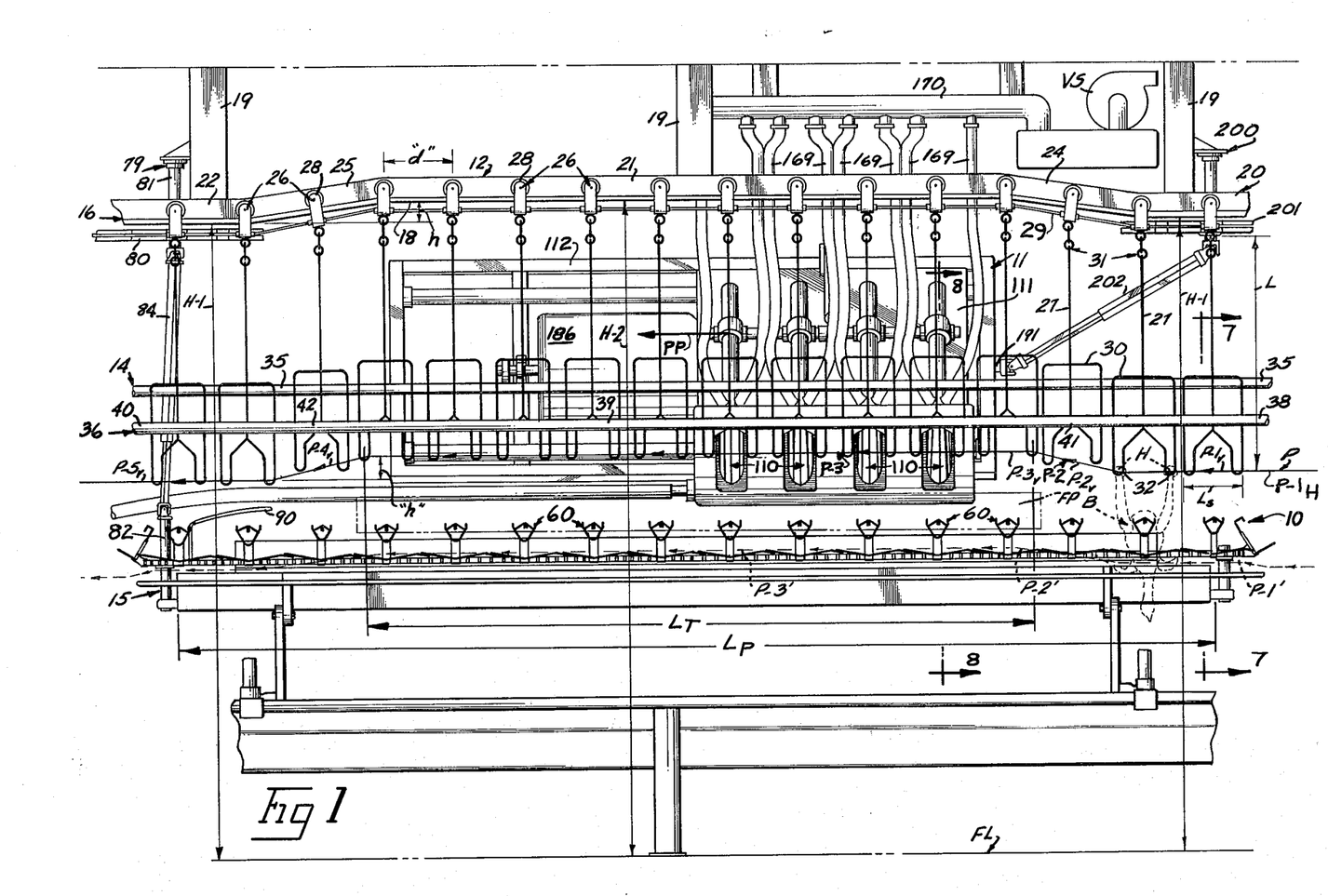
FIG. 1 is a front view of one embodiment of the invention in position on a poultry processing line.
Figure 2:
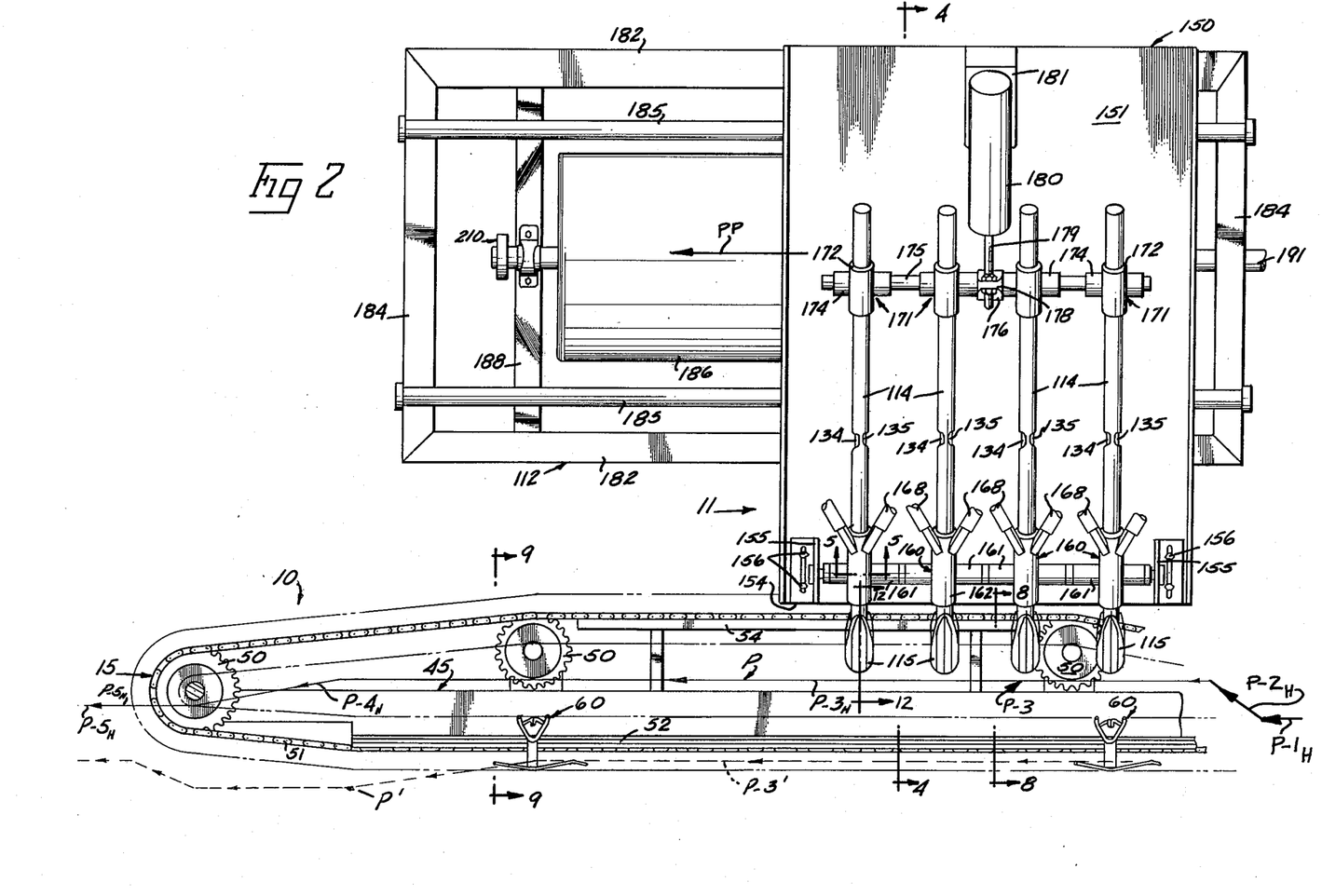
FIG. 2 is a top plan view of the machine of FIG. 1 with the cover removed.

Referring to the figures, the apparatus of the invention includes generally a positioning means 10 and an eviscerating means 11. The positioning means 10 moves the birds B along a prescribed path P as seen in FIGS. 1 and 2 while the eviscerating means removes the viscera from the body cavity of the bird.

POSITIONING MEANS

The positioning means 10 includes generally an overhead conveyor 12, a guide assembly 14 and a positioning assembly 15. The conveyor 12 is of the overhead type with an overhead inverted T-shaped trolley track 16 having transversely extending support flanges 18 on the lower side thereof. Supports 19 mount the track 16 above the floor level FL of the processing plant.

Track 16 has a first section 20 a first prescribed distance H-1 above floor level FL and parallel thereto, a second section 21 a second prescribed distance H-2 above floor level FL and parallel thereto, and a third section 22 the first prescribed distance H-1 above floor level FL and parallel thereto. The distance H-2 is greater than the distance H-1 by a prescribed amount $h$. Transfer sections 24 and 25 respectively connect the first and second sections and the second and third sections as will be apparent.

A plurality of trolley assemblies 26 of conventional design are movably mounted on track 16 by their wheels 28 which roll along the upper surface of flanges 18 in known manner. Drive means 29 connect the trolley assemblies 26 in known manner to successively move the assemblies 26 along track 16 a predetermined distance $d$ apart.

Each trolley assembly 26 flexibly mounts a shackle member 30 therebelow suspended on a flexible connector 31, here shown as a link member 27. Each shackle member 30 is provided with a pair of spaced apart u-shaped hock clamping portions 32 which receive the hocks H of the carcass of bird B and support same through the weight of the bird forcing the hocks into the portions 32. The weight of the bird forces the connector 31 to its most extended length so that the bird B is free to swing about an arcuate plane defined by length L.

As the birds B are moved along path P passing through the hocks H thereof as viewed in a vertical plane in FIG. 1, they move along a first horizontal portion $P-1_V$ when the trolley assembly is on the first section 20 of track 16, move upwardly along the inclined portion $P-2_V$ when the trolley assembly 26 is on the transfer section 24, move along a second horizontal portion $P-3_V$ when the trolley assembly 26 is on the second section 21 of track 16, move downwardly along the inclined portion $P-4_V$ when the trolley assembly 26 is on the transfer section 25 of track 16 and thence move along a third horizontal portion $P-5_V$ when the trolley assembly 26 is on the third section 22 of track 16. It will be seen that portions $P-1_V$ and $P-5_V$ are horizontally aligned while the portion $P-3_V$ is the distance $h$ above portions P-1 and $P-5_V$.

Figure 4:
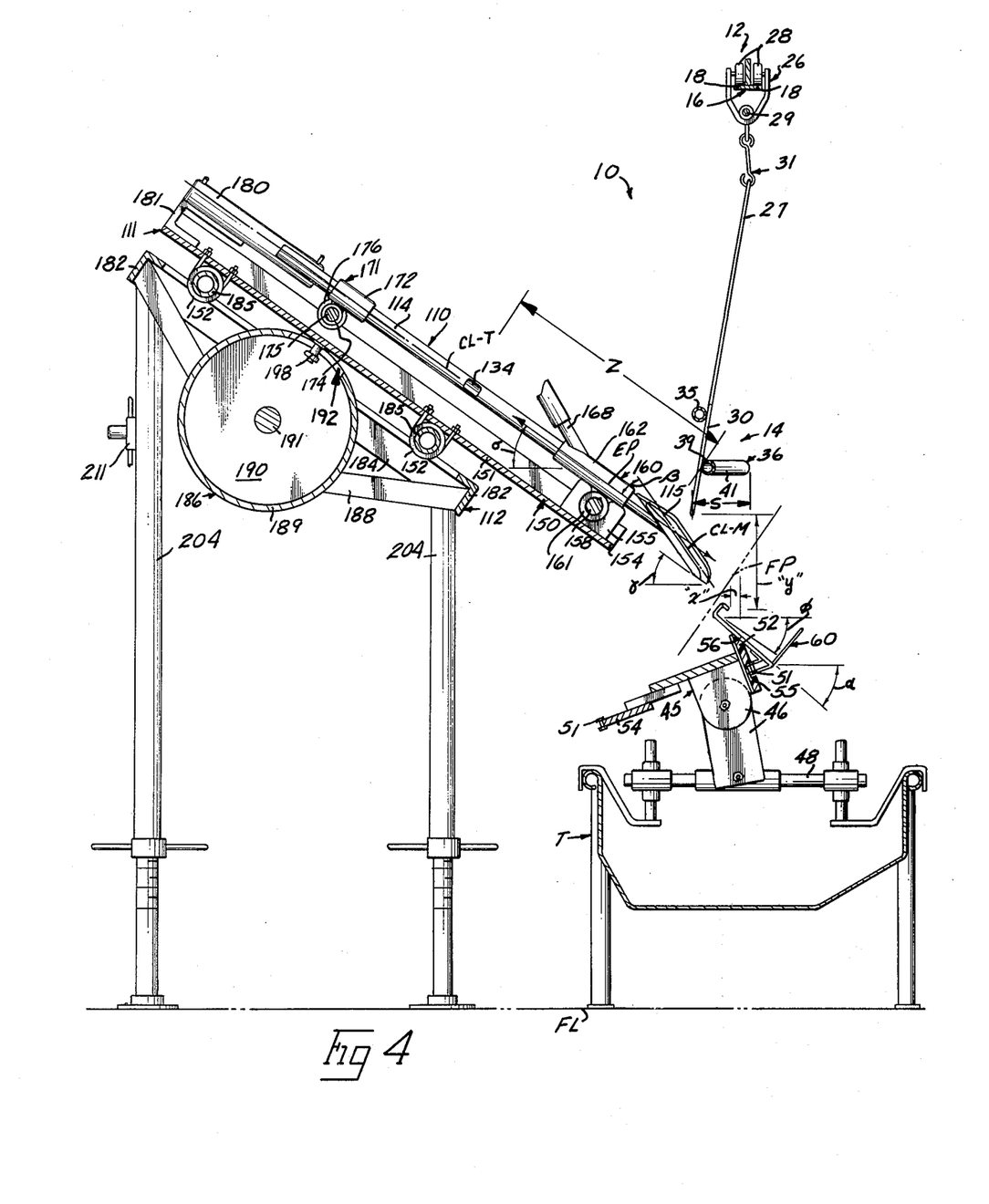
FIG. 4 is a cross-sectional view taken along line 4—4 in FIG. 2.

The guide assembly 14 includes an upper inside guide rod 35 positioned along the backside of shackle members 30 as seen in FIGS. 1 and 2 and a lower outside guide rod 36 positioned in front of shackle members 30 below rod 35. Referring specifically to FIG. 4, the rod 35 is straight and rod 36 extends partly under rod 35. Rod 36 has a first straight section 38, a second straight section 39 displaced rearwardly of the first straight section under rod 35 and parallel thereto, and a third straight section 40 aligned with the first straight section 38 seen in FIG. 1. Sections 38 and 40 position the shackle members 30 passing therealong directly under the track 16 while section 39 displaces the hock clamping portions 32 of shackle members 30 rearwardly from under the track 16 seen in FIG. 4 a prescribed space $s$. Transition sections 41 and 42 respectively join sections 38 and 39 and sections 39 and 40 seen in FIG. 1 as will be apparent.

As the birds B are moved along path P passing through the hocks H thereof as viewed in a horizontal plane in FIG. 2, they move along a first straight portion $P-1_H$ when shackle members 30 pass along section 38 of rod 36, move along a second angled portion $P-2_H$ when shackle members 30 pass along section 41 of rod 36, move along a third straight portion $P-3_H$ when shackle members 30 pass along section 39 or rod 36, move along a fourth angled portion $P-4_H$ as shackle members 30 pass along section 42 or rod 36, and thence move along a fifth straight portion $P-5_H$ as shackle members 30 pass along section 40 of rod 36. The rods 35 and 36 are arranged so that the vertical component $P-1_V$ coincides with horizontal component $P-1_H$ seen in FIG. 1 and likewise with portions $P-2_V$ and $P-2_H$, portions $P-3_V$ and $P-3_H$, portions $P-4_V$ and $P-4_H$, and portions $P-5_V$ and $P-5_H$ of the path P.

Figures 7, 8:
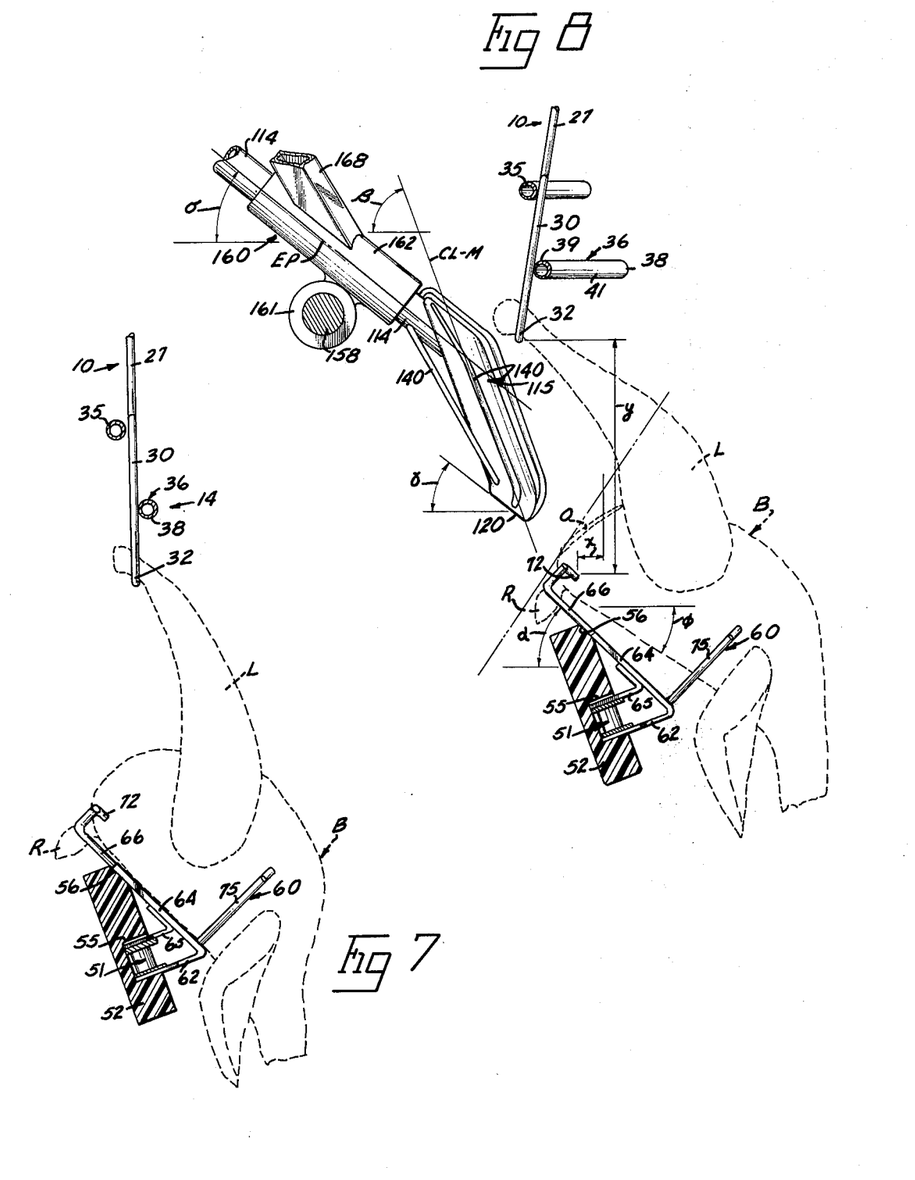
FIG. 7 is an enlarged cross-sectional view taken along line 7—7 in FIG. 1.
FIG. 8 is an enlarged cross-sectional view taken along line 8—8 in FIGS. 1 and 2.

The positioning assembly 15 serves to orient the birds B as they pass along path P on shackle members 30 and in conjunction with the conveyor 12 and guide assembly 14 serve to position the birds B for the eviscerating means 11. As the birds B pass into the invention, an access opening O into the body cavity C has already been made at the vent V of birds B as is best seen in FIG. 8 and as is conventionally done in poultry processing. While some applications of the invention need not have the viscera removed therefrom, the particular embodiment shown is designed to have the viscera already removed from the body cavity C with the exception of the lungs L.

Assembly 15 includes a support frame 45 adjustably mounted by articulated links 46 as best seen in FIG. 4. The links 46 are illustrated carried by a support 48 mounted on a standard wash trough T used in poultry processing, however, it is to be understood that other type supports could be used.

The support frame 45 rotatably mounts a plurality of chain sprockets 50 thereon seen in FIG. 2. An endless link chain 51 is carried by and in mesh with sprockets 50. The forward flight of chain 51 is positioned by guide member 52 and the return flight is positioned by guide member 54. Guide member 52 is of a wear resistant plastic material and defines a longtiudinally extending channel 55 along the length thereof aligned with sprockets 50 and within which chain 51 rides to position same seen in FIG. 4. That portion of guide member 52 lying above channel 55 defines an anvil 56 as described in more detail hereinafter.

Spaced along chain 51 are a plurality of positioning members 60 which engage the birds B in the lower portion of the access opening O as best seen in FIG. 8 to position the opening O in conjunction with the shackle members 30. Each positioning member 60 includes a rectangular central body 61 seen in FIG. 11 having a lower mounting lug 62 connected to its lower end 64 and an upper mounting leg 65 connected to the back side of the body 61 intermediate its ends. Lugs 62 and 65 extend rearwardly from body 61 and serve as one set of the upper and lower links for chain 51. This positions body 61 at an angle $\alpha$ with respect to the horizontal, here shown as 45°, and perpendicular to the longitudinal centerline CL-2 of chain 51 as will be explained.

Figures 11, 12, 13:
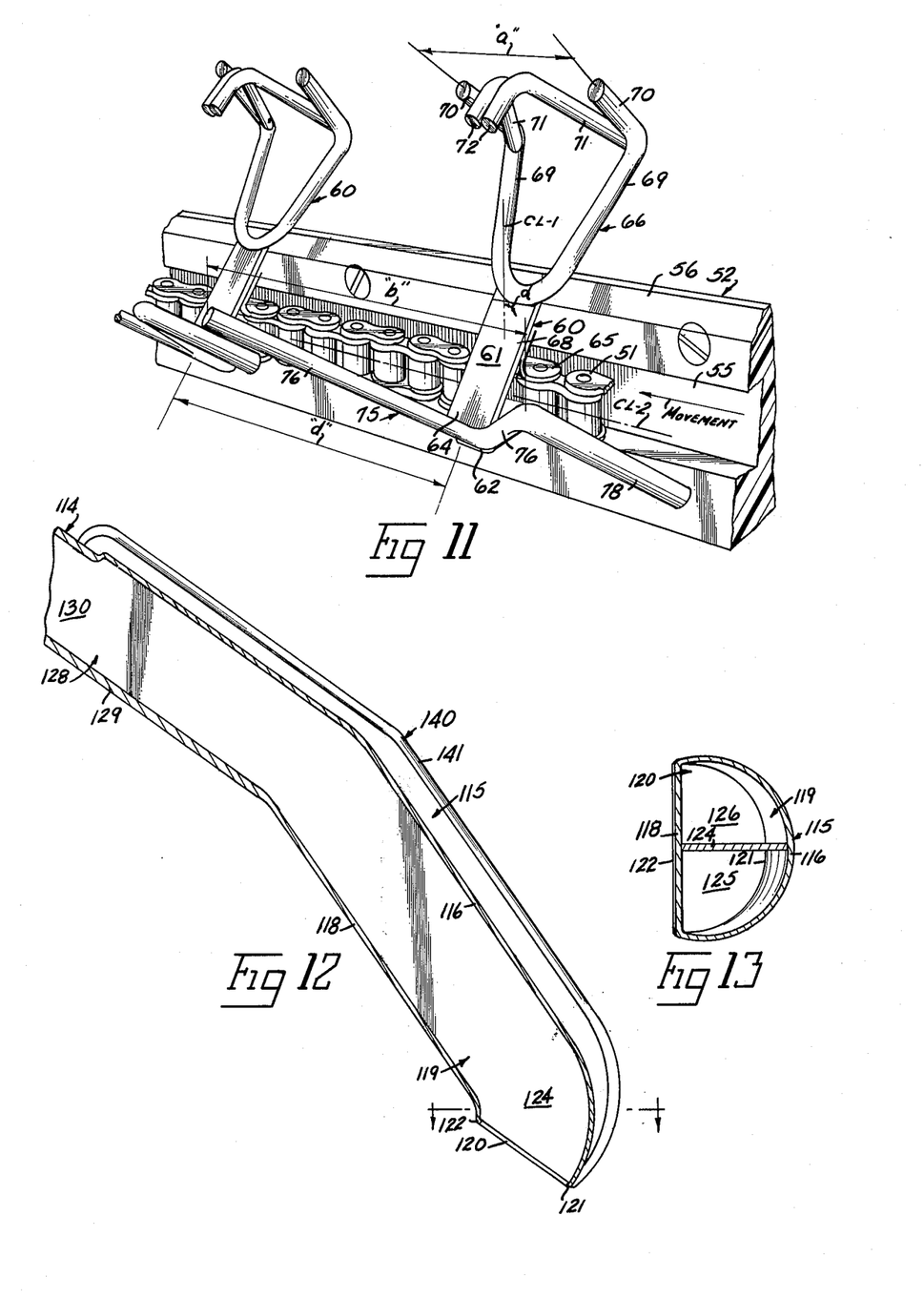
FIG. 11 is an enlarged perspective view of the positioning member of FIG. 10.
FIG. 12 is an enlarged cross-sectional view of the eviscerating tool taken along line 12—12 in FIG. 2.
FIG. 13 is a cross-sectional view taken along line 13—13 in FIG. 12.

Extending upwardly from body 61 is a V-shaped rod yoke 66 having its bight attached to the upper end 68 of body 61 and its diverging legs 69 lying in the plane of body 61. The upper ends of leg 69 are formed into forwardly projecting stub legs 70 which are generally normal to the plane of body 61, parallel to each other and spaced apart a distance $a$. The distance $a$ is such that the stub legs 70 will just fit between the legs L of the birds B as will be explained. A pair of forwardly facing rod members 71 are provided, one being attached to each leg 69 at the juncture with stub leg 70. Rod members 71 converge toward each other and each is provided a downwardly facing hook portion 72. Hook portions 72 lie in juxtaposition with each other and are attached. The rod members 71 lie in the plane of legs 70 while the hook portions 72 are parallel to the plane of body 61. The hook portions 72 are positioned just forwardly of the forwardly projecting ends of stub legs 70.

A V-shaped back support yoke 75 is attached to the lower end 64 of body 61 through its bight with the diverging legs 76 extending forwardly of body 61 in a plane substantially normal to the plane of body 61. The distance $b$ between the outer ends of legs 76 is sufficient to span the back of bird B as will be explained. The outer end of the trailing leg 76 is provided with a rearwardly extending projection 78.

The positioning members 60 are attached to chain 51 the same prescribed distance $d$ apart as the assemblies 26 so that a member 60 will be vertically aligned with each shackle member 30 as it moves the birds along path P. An idler drive 79 seen in FIG. 1 connects one of the sprockets 50 to the drive means 29 of conveyor 12. The drive 79 includes an idler sprocket 80 engagable with and driven by the trolley assemblies 26 and drive means 29 in known manner. The output shaft 81 of sprocket 81 is universally connected to the input shaft 82 of sprocket 50 through an extendable shaft 84. The back support yoke 75 is arranged so that the trailing projection 78 of each member 60 underlies the leading end of the leg 76 of the next adjacent trailing positioning member 60 seen in FIG. 11. The yokes 75, then, form a continuous saw tooth shaped support along the length of the forward flight of chain 51.

OPERATION OF POSITIONING MEANS

In operation, the articulated links 46 are adjusted to position the assembly 15 so that it is centered as to length under the conveyor 12 and guide assembly 14 and the positioning members 60 are moved along generally rearwardly of and parallel to the vertical plane of conveyor track 16. The forwardly facing ends of hook portions 72 are located a distance $x$ rearwardly of the vertical plane of conveyor track 16 as best seen in FIG. 4 and a prescribed distance $y$ below the hock clamping portions 32 of shackle members 30 also seen in FIG. 4. The distances $x$ and $y$ are such that the rump R of the bird B will pass just forwardly of the forward ends of hook portions 78 as the back support yoke 75 engages the back of the bird B rearwardly and upwardly of its wings as seen in FIG. 7 to pivot the bird B about the joints between its legs and body. When the bird B has been pivoted as seen in FIG. 7, the hook portions 78 of member 60 now lie above the lower edge of the access opening O. The pivoting of bird B by yoke 75 displaces the breast portion of the bird forwardly of the vertical plane of portion P-1 of path P so that the breast portion is now moving along a forwardly and upwardly deflected portion P-1' of path P' as seen in FIGS. 1 and 2. It will also be noted that the length $L_p$ of the positioning means 15 seen in FIG. 1 is longer than the length $L_T$ of that portion P-3 of path P so that the member 60 engages the bird B at least one shackle width $L_S$ as seen in FIG. 1 so that the member 60 is ready to fix the location of the access opening O prior to the movement of the trolley assembly 26 up the transfer section 24 of track 16.

The member 60 is moved along the guide member 52 synchronously with the movement of bird B by the conveyor 10. The trolley assembly 26 carrying bird B then moves up the inclined transfer section 24 of track 16. Since the member 60 is not moved upwardly, this shifts the bird B upwardly with respect to member 60 along the upwardly and rearwardly deflected portion P-2 of path P to cause the lower edge of the access opening O to be engaged by the hook portions 78 with the rump R lying between the rod members 71 seen in FIG. 8. As the trolley assembly 26 continues to move up transfer section 24, the co-operation between member 60 and shackle member 30 causes the breast portion of the bird to be lifted to lift the back of the bird above and clear the back support yoke 75 to form an angle $\phi$, here shown as approximately 35°, with respect to the horizontal. The bird B is now supported solely between the hock clamping portions 32 of the shackle member 30 and the hook portions 78 of the positioning member 60. This maintains the access opening O in bird B in a fixed plane FP as best seen in FIGS. 1 and 7–9 as it is moved along the portion P-3 of path P and the breast portions of the bird are moved along the upwardly and rearwardly deflected portions P-3' of path P' for the eviscerating operation while at the same time allowing the breast portion of bird B to be moved through the flexing of its muscles and hip joint connecting its legs with the body as will be explained more fully hereinafter.

The bird B continues to move with the trolley assembly 26 which lowers the bird when assembly 26 moves down the transfer section 25 so that the breast portion is again lowered until its back rests in yoke 75 and releases the hook portions 78 from access opening O. As the trolley assembly 26 continues to move along the third section 22 of track 16, the deflection of chain 51 and member 60 around sprocket 50 releases the bird B to move away from the eviscerating station on shackle member 30. To assist in freeing bird B from member 60, a deflector 90 may be provided as seen in FIG. 1.

EVISCERATING MEANS

Referring now to FIG. 1 it will be seen that the eviscerating means 11 is located adjacent the positioning means 10 so that the eviscerating operation can be performed during passage of bird B along paths P and P'.

As best seen in FIGS. 2–9 and 12–17 the eviscerating means 11 includes a plurality of eviscerating tools 110 reciprocally mounted by a carriage assembly 111 movably mounted by a support frame 112. The tools 110 reciprocate along an eviscerating path EP shown in FIG. 4 normal to that portion P-3 of path P while the carriage assembly is movable along a positioning path PP generally parallel to portion P-3 of path P.

As seen in FIGS. 4–6 and 12–14, the tool 110 includes a mounting tube 114 and a spoon shaped eviscerating member 115 carried by one end of tube 114. Member 115 is tubular with an arcuate front wall 116 closed on its rear edges by a generally flat back wall 118 to provide a vacuum passage 119 centrally therethrough. The centerline CL-M of member 115 defines an angle $\beta$ with respect to the centerline CL-T of tube 114. While different angles $\beta$ may be used, one such angle is 30° as will become apparent.

The projecting end of member 115 curves downwardly to provide a downwardly directed open mouth 120 of vacuum passage 119 having a generally semicircular shape with the arcuate portion defined by the leading edge 121 of the front wall 116 and the straight portion defined by the leading edge 122 of the back wall 118. The leading edges 121 and 121 are both smoothly rounded to prevent injury to the bird B during evisceration as will be apparent. A divider 124 is positioned in the vacuum passage 119 and terminates in the plane of mouth 120 to divide passage 119 into right and left subpassages 125 and 126 as seen in FIGS. 12 and 13. The mouth 120 defines an angle $\gamma$ seen in FIG. 4 with centerline CL-M of member 115, here shown as 30°, as will be explained.

Figures 5, 6:
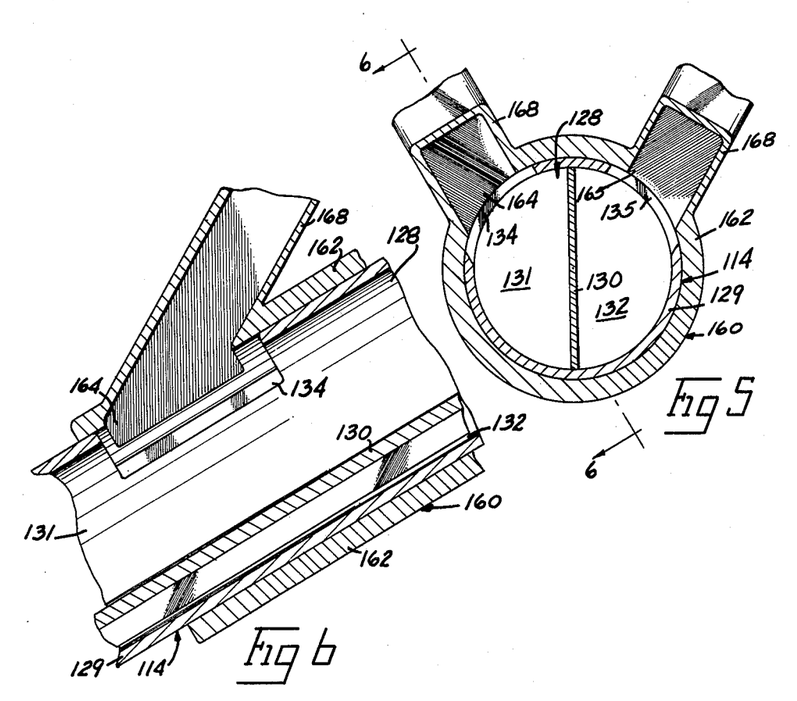
FIG. 5 is an enlarged cross-sectional view taken along line 5—5 in FIG. 2.
FIG. 6 is a cross-sectional view taken along line 6—6 in FIG. 5.

The mounting tube 114 defines an angle $\sigma$ seen in FIG. 4 with respect to the horizontal, here shown as 40°, and is generally circular in cross section with a vacuum transfer passage 128 shown in FIGS. 5, 6 and 12 along the interior of side wall 129, extending a prescribed distance z therealong seen in FIG. 4 from the juncture of member 115 and communicating with vacuum passage 119 in member 115 at its lower end. A divider 130 shown in FIGS. 5, 6 and 12 extends diametrically across passage 128 along its length and joins with divider 124 in member 115 to provide subpassages 131 and 132 communicating with passages 125 and 126 respectively. A right port 134 is defined through the side wall 129 in communication with the upper end of right subpassage 131 and a left port is defined through side wall 129 at the upper end of left subpassage 132. The ports 134 and 135 selectively connect the mouth 130 with vacuum source VS as seen in FIG. 1 as hereinafter explained.

Figures 9, 10, 14:
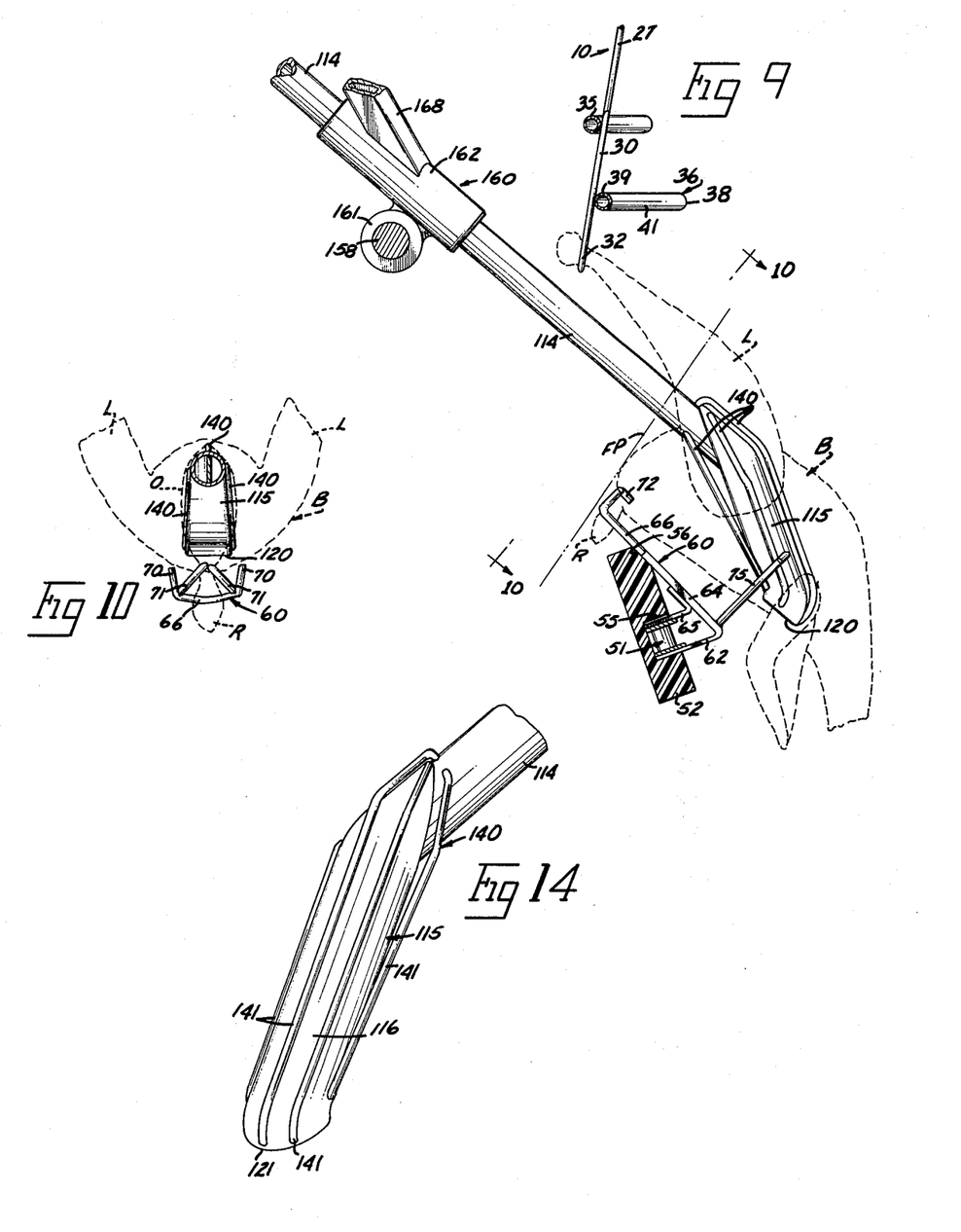
FIG. 9 is an enlarged cross-sectional view taken along line 9—9 in FIG. 2.
FIG. 10 is a fragmentary view taken along the line 10—10 in FIG. 9.
FIG. 14 is a perspective view of the eviscerating tool.
Figures 15, 16, 17:
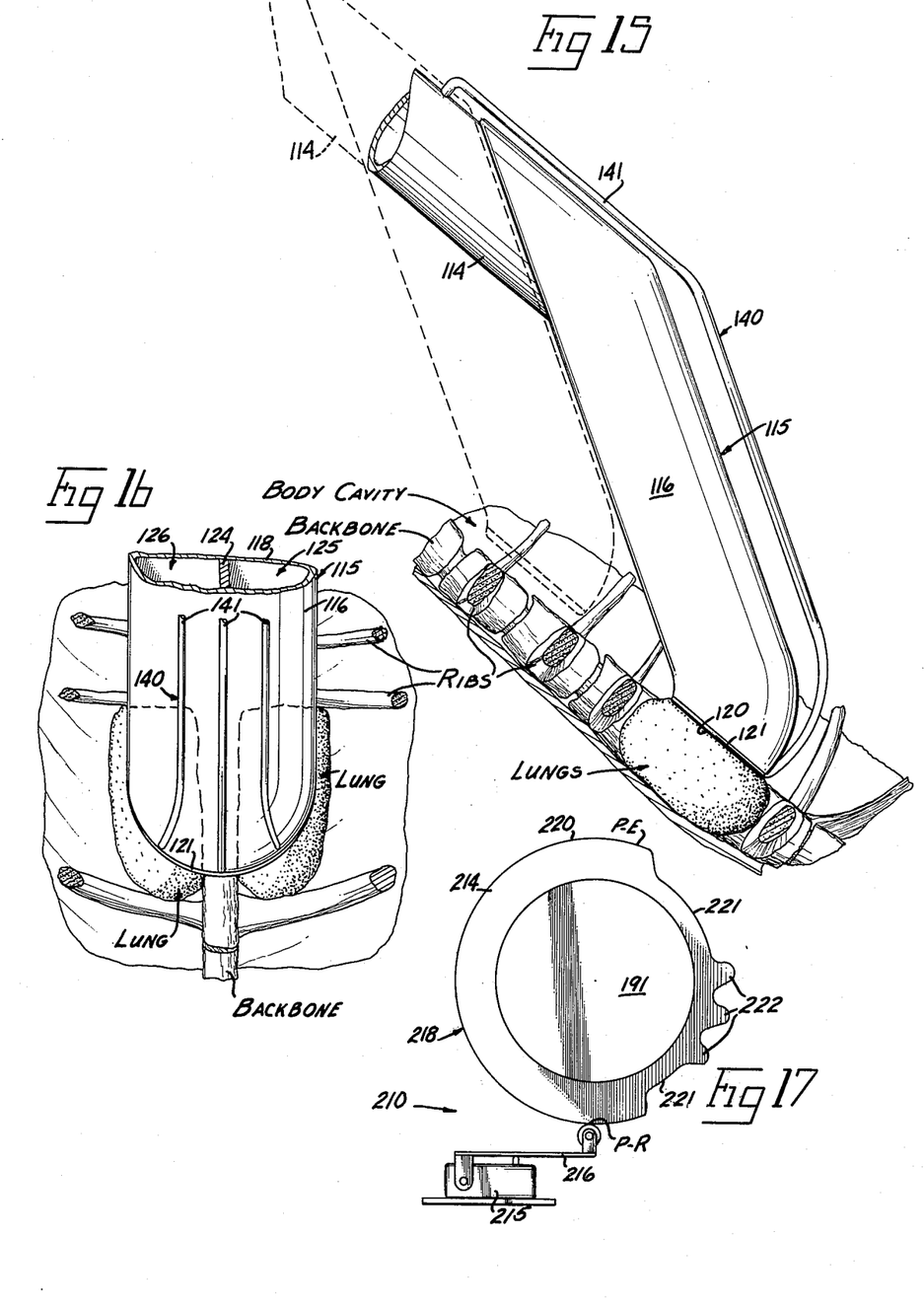
FIG. 15 is a view showing the eviscerating tool in lung removing position.
FIG. 16 is another view showing the tool in lung removing position.
FIG. 17 is an enlarged view showing the cam switch arrangement.

A spacer assembly 140 shwon in FIGS. 12 and 14 is provided on member 115 to prevent collapse of the body cavity of bird B when the member 115 is inserted therein as seen in FIGS. 15 and 16 and a vacuum is imposed through mouth 120 as will be apparent. Spacer assembly 140 includes a plurality of spacer rods 141 connected to member 151 along the arcuate front wall 116 thereof and shaped to hold the body cavity of the bird open when the mouth 120 is in the vicinity of the lungs L. The rearmost ends of at least part of the spacer rods 141 always protrude through the access opening O to also prevent its collapse.

The carriage assembly 111 includes a movable support table 150 seen in FIGS. 2 and 4 which is a generally rectangular base plate 151 having two pairs of aligned bushings 152 on the lower side thereof as seen in FIG. 4 which are connected to the support frame 112 as will be explained. The leading edge 154 of base plate 151 is generally parallel to portion P-3 of path P and spaced rearwardly thereof as seen in FIG. 2 and a pair of spaced apart, upstanding, mounting ears 155 are fixedly yet movably secured to plate 151 adjacent edge 154 by fasteners 156. A pivot shaft 158 is carried by and between ears 155 generally parallel to portion P-3 of path P.

A plurality of vacuum connector-supports 160 are pivotally mounted on shaft 158 and reciprocally carry the tools 110. While different numbers of connector-supports 160 may be used, four are illustrated herein since four tools 110 are also illustrated. Each connector-support 160 includes a first bushing 161 rotatably journalled on shaft 158 with a cross bushing 162 affixed to the top of bushings 161 so that its centerline generally perpendicular to that of shaft 158. The support tube 114 of tool 110 is reciprocally journalled in cross bushing 162 for sliding movement toward and away from portion P-3 of path P. Cross bushing 162 defines right and left ports 164 and 165 therethrough communicating with the central passage 166 through bushing 162 as best seen in FIGS. 5 and 6. Ports 164 and 165 are located to align respectively with the ports 134 and 135 in the mounting tube 114 of tool 110 when mouth 120 of member 115 is located over the lungs L of bird B as will be more fully explained. Connectors 168 connect each of the ports 164 and 165 to the vacuum source VS through flexible tubing 169 and manifold 170 shown in FIG. 1.

The upwardly extending end of each support tube 114 is mounted in a collar assembly 171 shown in FIGS. 2 and 4 located up tube 114 past ports 134 and 135. Each collar assembly 171 includes a first collar 172 fixed yet releasably secured to tube 114 as best seen in FIG. 2 and a cross collar 174 attached to the underside of the first collar 172 with its passage oriented perpendicular to the passage through collar 172 and parallel to portion P-3 of path P. A drive shaft 175 is pivotally received through the cross collar of each collar assembly 171.

The central portion of shaft 175 between the two middle collar assemblies 171 is connected to a drive collar 176 having an upstanding driving lug 178 thereon. The end of piston rod 179 of a double acting fluid cylinder 180 is connected to lug 178 for moving drive shaft 175 and tools 110 along their centerlines CL-T. The stroke of cylinder 180 is such that member 115 will be moved through plane FP and into the body cavity of birds B through the access opening O as more fully explained hereinafter. The cylinder 180 is mounted on a bracket 181 on table 150 as best seen in FIG. 4.

The table 150 is carried by the support frame 112 having an open rectangular configuration defined by opposed side angles 182 joined by opposed end angles 184. It will be noted that the length of frame 112 is approximately twice that of table 150 as will become more apparent. A pair of spaced apart parallel guide rods 185 extend between end angles 184 and are arranged parallel to shafts 158 and 175 and portion P-3 of path P. The bushings 152 on the bottom of plate 151 of table 150 are slidably received on rods 185 for reciprocal movement of table 150 back and forth therealong.

Figure 3:
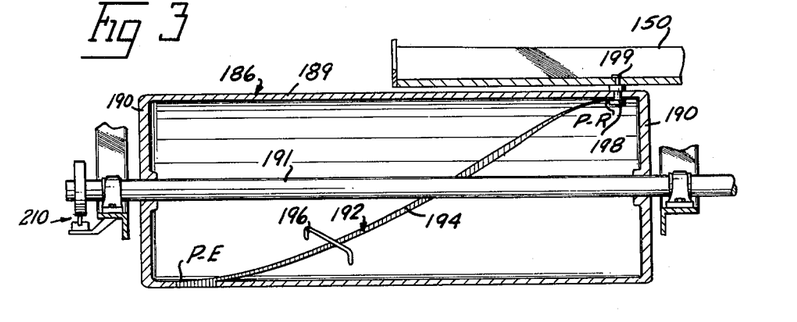
FIG. 3 is a partial view showing the cam - cam follower connection.

A drive cam 186 shown in FIGS. 2–14 is rotatably carried by frame 112 for selectively positioning table 150 along rods 185. Cam 186 is rotatably mounted by supports 188 extending between side angles 182. Cam 186 is an annular cam with a cylindrical side wall 189 and closed at opposite ends by disc shaped end walls 190. A support shaft 191 concentrically located with respect to side wall 189 mounts cam 186 between supports 188. A camming slot 192 is defined through the side wall 189 and extends 360° therearound with a rise portion 194 as seen in FIG. 3 from return point P-R to the extend point P-E for 180° and a like return portion extends from point P-E to point P-R. Crossover braces 196 may extend across slot 192 to connect the adjacent portions of side wall 189.

Cam follower 198 rotatably journalled on stub shaft 199 attached to the bottom of plate 151 of table 150 extends into slot 192 to position table 150 in response to rotation of cam 186. As the cam 186 is rotated table 150 is moved along guide rods 185 in synchronization with movement of birds B along portion P-3 of path P as follower 198 moves from point P-R to P-E for evisceration and then returns table 150 to repeat the cycle as follower 198 moves from point P-E to P-R.

An idler drive 200 seen in FIG. 1 similar to idler drive 79 for the positioning assembly 15 connects the support shaft 191 through cam 186 with the drive means 29 of conveyor 12 to rotate cam 186 in synchronization with the movement of the trolley assemblies 26 along track 16. The idler drive 200 includes an idler sprocket 201 engagable with and driven by the troller assemblies 26 and drive means 29 with sprocket 201 universally connected to support shaft 191 through an extendable shaft 202.

The support frame 112 is mounted on legs 204 seen in FIG. 1 to position same adjacent the path P. Legs 204 may be adjustable to vary the height of frame 112 above floor level FL. This locates the centerlines CL-T of tools 110 at the prescribed angle σ with respect to the horizontal or floor level. This locates the members 115 of tools 110 generally perpendicular to the fixed plane FP through which the access openings O in birds P pass and spaced thereabove a sufficient distance to allow the projecting ends of members 115 to clear birds B when they are retracted and to allow the members to pass just above the hook portions 78 of positioning members 60 as the tools 110 are extended by cylinder 180.

The camming slot 192 in cam 186 is proportioned so that the table 150 starts moving on its extend stroke when the tools 110 are aligned with the access openings in birds B as seen in FIG. 1 and continues to move along portion P-3 of path P at the same rate as the birds B move until cam follower 198 reaches point P-E on slot 192 whereupon the motion of table 150 is reversed to return to its retracted position as will be explained.

To synchronously control fluid cylinder 180 so as to selectively extend piston rod 179 thereof, a cam switch assembly 210 is provided on the end of support shaft 191 as best seen in FIG. 17 that controls the four-way solenoid valve 211 seen in FIG. 4 connecting the cylinder 180 with a fluid pressure source. Switch assembly 210 includes a cam 214 mounted shaft 191 and a switch 215 carried by frame 112 adjacent cam 214 and having an actuator 216 engaging the camming surface 218 of cam 214. Camming surface 218 includes a high rise portion 220 for more than 180° therearound with a low rise portion 221 the rest of the way around the cam. A plurality of intermediate rise portions 222 are imposed over portion 221 as will be apparent. The portions 220, 221 and 222 are so located that when the table 150 is at points P-R or P-E, the valve 211 maintains piston rod 179 retracted because actuator 216 is riding on portion 220 of camming surface 218. As the table 150 is moved from position P-R on its extend stroke, actuator moves into portion 221 of surface 218 to cause the piston rod 179 to fully extend members 115 fully into the body cavity of bird B so that the mouth 130 is located directly over the lungs L. As the table 150 continues to move toward point P-E, the intermediate rise portions 222 are engaged by actuator 216 to partly retract and then re-extend members 115 into the body cavity of the bird. Finally, just before the table 150 reaches point P-E, the portion 220 of camming surface 218 is engaged by actuator 216 to fully retract members 115 from the body cavity of bird B before table 150 reaches point P-E. As table 150 is retracted toward points P-R, the portion 220 maintains the piston rod 179 and members 115 fully retracted.

For sterilizing the members 115, a sterilizing assembly may be provided. The assembly includes a plurality of nozzled 231 carried by table 150 and connected to a source (not shown) of a sterilizing medium through tubes. The sterilizing medium is sprayed from the nozzles onto members 115 while they are being retracted.

OPERATION OF EVISCERATING MEANS

From the previously described operation of the positioning means 10, it is seen that the access opening O in each bird B is located in plane PL as the bird is moved along portion P-3 of path P. The eviscerating operation is performed while the bird passes along the portion P-3 of path P.

When cam follower 198 is located at point P-R on cam 186, the table 150 is located as shown in FIG. 1 so that each tool 110 is centrally located with respect to one of the shackle members 30 and in alignment with the access opening O of one of the birds B carried by the positioning means 10. The cam 186 causes the table 150 to move at the same rate as the conveyor 12 moves the birds B along the path P so that synchronization is maintained and tools 110 are maintained in alignment with the access openings O.

As table 150 and birds B move away from point P-R on cam 186, the switch cam 214 is rotated to cause the switch actuator 216 to move into the low rise portion 221 of the camming surface 218. This fully extends piston rod 179 to move the eviscerating members 115 into the body cavities of birds B as best seen in FIGS. 15 and 16 through access openings O. Because the breast portions of the birds B can be moved while the access openings remain relatively fixed, the bird B can move to orient itself about member 115 as it is inserted. This prevents damage to the carcass while allowing proper positioning of the tool within the bird. The resiliency of the muscles of the birds urge the carcass against the mouth 130 of member 115.

When the piston rod 179 of cylinder 180 is fully extended, the mouths 130 of tools 110 are located over the lung area and depress the breast portion below the position it occupies before insertion of member 115 to cause the muscles of the bird to resiliently force the ribs and backbone of the bird up against the open mouth 130 of tool 110. The position of members 115 is controlled by adjusting mechanism 177 connecting piston rod 179 to driving lug 178. Extension of piston rod 179 also aligns the ports 134 and 135 in mounting tube 114 respectively with ports 164 and 165 in connector-support 160 so that a vacuum is imposed at mouth 130. This causes a suction to be imposed on the lungs L to withdraw them from the body cavity through subpassages 125 and 126. Because the suction force may be lost if one lung is removed prior to the other if a single passage is used, the divided subpassages 125 and 126 insure that the suction force on each lung is separate and is not lost if one lung is removed before the other. The spacer assembly 140 engages the bird about the body cavity to insure the introduction of air therein and maintain the suction force on the lungs.

As the table 150 and birds B continue to move toward point P-E on cam 186, the switch actuator 216 is engaged by the first intermediate rise portion 222 of camming surface 218 to momentarily partly retract piston rod 179 and displace the mouth 130 of tool 110 off of the lungs L as shown by dashed lines in FIG. 15. This serves to dislodge any blockage of mouth 130 by lungs L and displace ports 134 and 135 in tool 110 out of alignment with ports 164 and 165 in connector-support 160 to momentarily kill the vacuum at mouth 130. As the actuator 216 again moves back to low rise portion 221, the rod 179 is re-extended to relocate mouth 130 over lungs L and re-establish the vacuum at mouth 130 to remove the remaining lungs. The rubbing action of the member 115 on lungs L also serves to loosen them and aid removal. This partly withdrawal process is repeated twice more to insure lung removal.

Before point P-E on cam 186 is reached, the high rise portion 220 of switch cam 214 engages actuator 216 to retract members 115 from the body cavity of the birds and allows the birds to continue to travel along path P. Cam 186 returns table 150 to points P-R on the cam so that the tools 110 are aligned with the next successive series of birds B carried by conveyor 12 and the operation is repeated.

While specific embodiments of the invention have been disclosed herein, it is to be understood that full use may be made of modifications, substitutions and equivalents without departing from the scope of the inventive concept.

We claim:

1. Poultry processing apparatus for positioning poultry having an access opening to the body cavity thereof at its vent including:
   conveying means for successively moving the poultry along a prescribed path in a head lowermost position, said conveying means including a hock engaging member for supporting the poultry by their hocks; and,
   positioning means including a holding member for engaging the poultry in the access opening in opposition to said hock engaging member to support the poultry between said holding member and said hock engaging member so that the access opening is located in a relatively fixed plane while the breast portion of the poultry is supported solely through its bone and muscle structure to allow the breast portion of the poultry to move with respect to said plane.

2. Poultry processing apparatus as set forth in claim 1 wherein said holding member includes a projecting end for engaging the poultry in its access opening in opposition to said hock engaging member and further including guide means for locating the access opening in the poultry with respect to said projecting end of said holding member and spacing means for moving said holding member and said hock engaging means with respect to each other to cause said holding member to project into the access opening and engage the poultry with said holding member in the access opening to support the poultry by said holding member and said hock engaging member.

3. Poultry processing apparatus as set forth in claim 2 wherein said guide means includes pivoting means operatively associated with said holding member to pivot the body of the poultry to a position so that said projecting end of said holding member lies in registration with the access opening.

4. Poultry processing apparatus as set forth in claim 3 wherein said conveying means and said positioning means are adjustably positioned with respect to each other.

5. Poultry processing apparatus as set forth in claim 4 further including synchronization means for selectively maintaining alignment between said hock engaging member and said holding member as said hock engaging member and said holding member are moved.

6. Eviscerating apparatus for removing selected organs from the body cavity of poultry through an access opening formed at its vent including:
   a conveyor comprising a support track having spaced sections lying in a common plane and an elevated section connecting said spaced sections to form a continuous track, said elevated section lying in a plane parallel to said common plane and spaced thereabove a prescribed distance; a plurality of wheeled trolley assemblies supported on said track for movement therealong; a shackle member flexibly carried by each trolley assembly and having hock clamping portions at the free end thereof for engaging and supporting the poultry in a head lowermost position by their hocks; and drive means connecting said trolley assemblies for successively moving said trolley assemblies and said shackle member along said track so that said shackle members are a prescribed distance apart;
   guide means for deflecting said shackle members a prescribed distance rearwardly from the vertical plane of said track as said trolley assemblies move along said elevated section of said track;
   positioning means positioned below said hock clamping portions of said shackle members comprising a chain support; an endless chain movably carried by said support having an operative flight generally parallel to said common plane of said track and a prescribed distance therebelow; a plurality of positioning members carried by said endless chain and movable therewith; said positioning members spaced apart said prescribed distance between said shackle members, each of said positioning members including a hook portion insertable into the access opening in opposition to said hock clamping portions of said shackle member and a V-shaped orienting member positioned below and forwardly of said hook portion in alignment therewith for engaging the poultry at their back and pivoting the poultry about their leg joints to locate said hook portions in registration with the access opening when said trolley assemblies are located on said spaced sections of said track, said elevated section of said track raising said trolley assemblies and said shackle members with respect to said hook portions of said positioning members to insert said hook portion into the access opening and engage the poultry thereat to cause the back of the poultry to be lifted from said orienting member and the breast portion of the poultry to be flexibly suspended in cantilever fashion through its bone and muscle structure; and idler drive means drivingly connecting said endless chain to said conveyor drive means for synchronously moving said endless chain with said trolley assemblies to maintain alignment between said shackle members and said positioning members on said operative flight of said chain; and, vacuum eviscerating means including a support frame comprising a pair of parallel, spaced apart support rods oriented generally parallel to said track and said operative flight of said chain; a table movably mounted on said support rods for movement therealong; cam means operatively connected to said table and driven by said conveyor drive means for moving said table synchronously with said shackle member and said positioning members and parallel to the path of movement of said shackle member; at least one eviscerating tool carried by said table and movable therewith in alignment with said shackle member and said positioning member; a connector pivotally mounted on said table and slidably mounting said tool for movement perpendicular to the path of movement of said shackle member; a fluid cylinder mounted on said table and having its piston rod operatively connected to said tool for selectively moving said tool slidably within said connector; cam switch means for selectively extending and retracting said piston rod, said tool including an eviscerating member on the projecting end thereof extending within the body cavity through the access opening in the poultry carried by said shackle member and said positioning member when said piston rod is extended and withdrawn from the body cavity when said piston rod is retracted, and a spacer assembly carried by said eviscerating member for preventing collapse of said body cavity, said eviscerating tool defining a vacuum passage therethrough having an open mouth within said body cavity when said member is extending therein; and, vacuum means communicating with said vacuum passage when said piston rod is extended.

7. The poultry processing apparatus of claim 1 wherein said holding member comprises:
a main body having a first end and a second end;
a hook member attached to and extending from said first end of said body, said hook member having a projection constructed and arranged to selectively extend into the access opening of the poultry and engage the poultry within the access opening; and,
body support means carried by said second end of said main body for selectively aligning the body of the poultry with said hook member so that said projection on said hook member lies in registration with the access opening.

8. The poultry processing apparatus of claim 7 wherein said projection of said hook member is spaced outwardly from the plane of said main body a prescribed distance and oriented generally parallel to the plane of said main body.

9. The poultry processing apparatus of claim 7 wherein said body support means includes a V-shaped member having a pair of diverging legs projecting outwardly from said main body, said legs constructed and arranged to span the body of the poultry across its back and center the body of the poultry therebetween.

10. The poultry processing apparatus as set forth in claim 1 further including:
an eviscerating tool; and
carriage means for selectively moving said eviscerating tool along a predetermined path to cause said tool to extend into the body cavity through the access opening in the poultry.

11. The poultry processing apparatus as set forth in claim 10 wherein said eviscerating tool includes an open mouth at the projecting end thereof and further including vacuum producing means for selectively imposing a vacuum on the open mouth of said eviscerating tool to selectively withdraw viscera from the body cavity of the poultry.

12. The poultry processing apparatus as set forth in claim 11 further including synchronizing means operatively connecting said conveying means, said holding member and said carriage means for selectively maintaining alignment between the poultry and said eviscerating tool.

13. The poultry processing apparatus as set forth in claim 12 further including control means for selectively causing said carriage means to shift said open mouth of said eviscerating tool within the body cavity of the poultry and longitudinally of the backbone of the poultry.

14. The poultry processing apparatus as set forth in claim 13 further including body cavity spacing means operatively associated with said eviscerating tool and engagable with the poultry about the body cavity to maintain an air space between said eviscerating tool and the poultry.

15. The poultry processing apparatus of claim 2 wherein said conveying means includes a plurality of said hock engaging members spaced a prescribed distance apart for successively moving the poultry along said prescribed path and wherein said positioning means includes a chain support; an endless chain movably carried by said support having an operative flight generally parallel to said prescribed path; a plurality of said holding members carried by said endless chain and movable therewith; said holding members spaced apart said prescribed distance between said hock engaging members, each of said holding members including a hook portion insertable into the access opening in opposition to said hock engaging member and a V-shaped orienting member positioned below and forwardly of said hook portion in alignment therewith for engaging the poultry at their backs and pivoting the poultry about their leg joints to locate said hook portion in registration with the access opening as the poultry is moved along said prescribed path; guide means for moving said hock engaging members with respect to said hook portions of said holding members to insert said hook portion into the access opening and engage the poultry thereat to cause the back of the poultry to be lifted from said orienting member and the breast portion of the poultry to be flexibly suspended to cantilever fashion through its bone and muscle structure; and idler drive means drivingly connecting said endless chain to said conveying means for synchronously moving said endless chain with said hock engaging members to maintain alignment between said hock engaging members and said holding members on said operative flight of said chain.

16. The poultry processing apparatus of claim 15 further including eviscerating means including a support frame comprising a pair of parallel, spaced-apart support rods oriented generally parallel to said prescribed path; a carriage table movably mounted on said support rods for movement therealong; cam means operatively connected to said table and driven by said conveying means for moving said table synchronously with said hock engaging members and said holding members and parallel to said prescribed path; at least one eviscerating tool carried by said table and movable therewith in alignment with each of said hook engaging members and said holding members; tool support means reciprocally carried by said table and mounting said eviscerating tool thereon for movement generally perpendicular to said prescribed path along an eviscerating path; fluid cylinder means mounted on said table and connected to said tool support means for selectively moving said eviscerating tool along said eviscerating path into the body cavity through the access opening in the poultry carried by each of said hock engaging members and said holding members.

17. A holding assembly for use in eviscerating poultry having an access opening to the body cavity at the vent including:
   an endless flexible member;
   drive means for supporting said endless flexible member for movement along an endless path;
   guide means for selectively orienting said flexible endless member between said drive means; and,
   a plurality of holding members carried by said flexible endless member in spaced apart positions and movable with said flexible endless member, each of said holding members constructed and arranged to extend into and engage the access opening of the poultry.

18. The holding assembly of claim 17 further including conveying means comprising a plurality of shackle members spaced a prescribed distance apart and adapted to successively convey poultry along a prescribed path, said holding members spaced apart said prescribed distance, and means connecting said drive means with said conveying means to move said flexible member along said endless path synchronously with the movement of said shackle members.

19. The holding assembly of claim 15 wherein each of said holding members includes:
   a main body having a first end and a second end;
   a hook member attached to and extending from said first end of said body, said hook member having a projection constructed and arranged to selectively extend into the access opening of the poultry and engage the poultry within the access opening; and,
   body support means carried by said second end of said main body for selectively aligning the body of the poultry with said hook member so that said projection on said hook member lies in registration with the access opening.

20. A holding member for use in eviscerating poultry having an access opening to the body cavity at the vent including:
   a main body having a first end and a second end;
   a hook member attached to and extending from said first end of said body, said hook member having a projection constructed and arranged to selectively extend into the access opening of the poultry and engage the poultry within the access opening; and,
   body support means carried by said second end of said main body for selectively aligning the body of the poultry with said hook member so that said projection on said hook member lies in registration with the access opening.

21. The holding member of claim 20 wherein said body support means includes a V-shaped member having a pair of diverging legs projecting outwardly from said main body, said legs constructed and arranged to span the body of the poultry across its back and center the body of the poultry therebetween.

22. The holding member of claim 21 wherein said projection is spaced outwardly from the plane of said body a prescribed distance.

23. The holding member of claim 22 wherein the axis of said projection is oriented generally parallel to the plane of said body.

* * * * *